United States Patent [19]

King et al.

[11] Patent Number: 4,482,975
[45] Date of Patent: Nov. 13, 1984

[54] FUNCTION GENERATOR

[75] Inventors: Thomas M. King, Mesa; Cary R. Champlin, Chandler; Sam M. Daniel, Tempe, all of Ariz.

[73] Assignee: Motorola, Inc., Schaumburg, Ill.

[21] Appl. No.: 362,740

[22] Filed: Mar. 29, 1982

[51] Int. Cl.³ .............................................. G06J 1/00
[52] U.S. Cl. ................................... 364/608; 364/718
[58] Field of Search ............... 364/607, 608, 715, 718, 364/729, 735, 765

[56] References Cited

U.S. PATENT DOCUMENTS

| | | | |
|---|---|---|---|
| 2,962,214 | 11/1960 | Gordon | 364/718 |
| 3,345,505 | 10/1967 | Schmid | 364/608 |
| 3,506,810 | 4/1970 | Katell | 364/608 |
| 3,513,301 | 5/1970 | Howe | 364/608 |
| 3,828,175 | 8/1974 | Amdahl | 364/765 |
| 4,001,555 | 1/1977 | Levis | 364/608 |

Primary Examiner—Jerry Smith
Assistant Examiner—Michael R. Fleming
Attorney, Agent, or Firm—Eugene A. Parsons

[57] ABSTRACT

Apparatus for generating an output digital signal that approximates the value of a predetermined mathematical function lying in the X-Y plane at a point defined by an input digital signal. The mathematical function is approximated by a plurality of linear least-mean-square line segments each of which includes a central point, R, and a slope, S, with the desired point being defined by the equation F(X) approximates $R + S\Delta X$, where $\Delta X$ is the X distance between the central point R and the desired point. R, S and $\Delta X$ are precalculated and stored in PROM lookup tables and combined as stated in the above equation.

6 Claims, 3 Drawing Figures

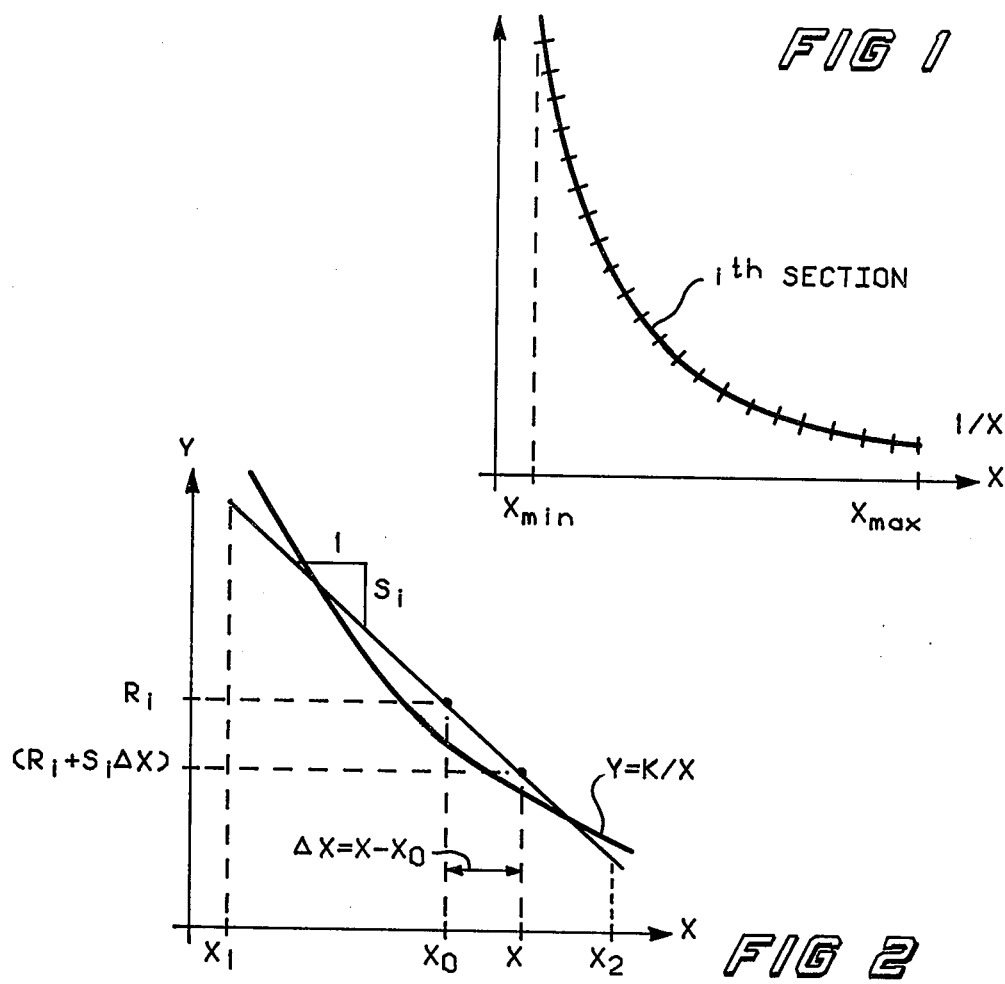
FIG 1
FIG 2
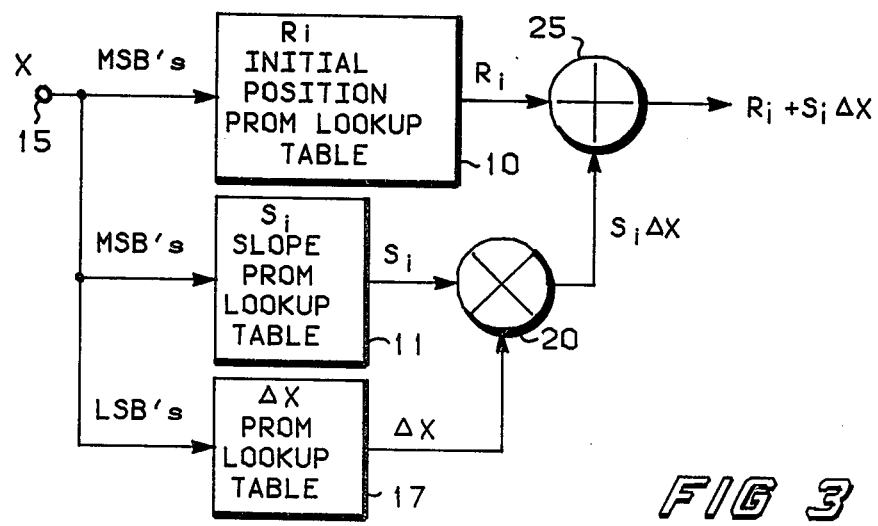
FIG 3

FUNCTION GENERATOR

BACKGROUND OF THE INVENTION

In the past, one method of providing a division type circuit is to generate a binary reciprocal of an input, X, and multiply the reciprocal by another input, Y, to produce a quotient Y/X. The uniqueness of this method lies in the manner of generating the reciprocal of X. It is known in the prior art, see for example U.S. Pat. No. 3,828,175, entitled "Method and Apparatus for Division Employing Table-Lookup and Functional Iteration", issued Aug. 6, 1974, that a table-lookup can be utilized which has stored therein all of the possible values of 1/X for the entire range of X to be utilized. The major problem with this type of apparatus is the size of lookup table (or amount of storage) that must be provided. For example, if the system uses a relatively standard 16 bit word as the X input and the range of interest is from 16,384 to 32,767, the system must be capable of storing 16,384 16 bit words or 262,144 bits of storage must be provied.

It will of course be undertood that it is desirable to have the capability of generating other types of functions (besides 1/X) and that these other generated functions might be utilized in mathematical operations in a fashion similar to the use of the reciprocal function discussed above. In the generation of the curve of a function in the X-Y plane, approximations such as the Taylor series expansion are known but these approximations, in general, incorporate such a large error that they are not acceptable for most of the present day mathematical operations.

SUMMARY OF THE INVENTION

The present invention pertains to a method and apparatus for generating an output digital signal that approximates the value of a predetermined mathematical function lying in the X-Y plane at a point defined by an input digital signal, said apparatus including position storage means, having stored therein a plurality of precalculated points, $R_i$, each lying on a different linear least-mean-square segment approximating a different section of the mathematical function, slope storage means having stored therein a slope $S_i$, for each of the line segments, means for determining the distance, $\Delta X$, along the X axis between the point $R_i$ and the point defined by the input digital signal, multiplication means connected to supply the product $S_i\Delta X$, and summing means providing the output signal, the sum $R_i + S_i\Delta X$, which is an approximation of the value of the mathematical function at the point defined by the input digital signal.

It is an object of the present invention to provide new and improved apparatus for generating an output digital signal that approximates the value of a predetermined mathematical function lying in the X-Y plane at a point defined by an input digital signal.

It is a further object of the present invention to provide apparatus for generating an output digital signal that approximates the value of a predetermined mathematical function lying in the X-Y plane at a point defined by an input digital signal with the use of linear least-mean-square line segments approximating different sections of the mathematical function.

It is a further object of the present invention to provide apparatus for generating an output digital signal that approximates the value of a predetermined mathematical function lying in the X-Y plane at a point defined by an input digital signal within ±1 bit error or less, and which greatly reduced the amount of storage and apparatus required.

These and other objects of this invention will become apparent to those skilled in the art upon consideration of the accompanying specification, claims and drawings.

BRIEF DESCRIPTION OF THE DRAWINGS

Referring to the drawings:

FIG. 1 is a graphical representation of a typical mathematical function which it may be desired to approximate;

FIG. 2 is an enlarged portion of the curve illustrated in FIG. 1; and

FIG. 3 is a simplified block diagram of apparatus for generating an output digital signal embodying the present invention.

DESCRIPTION OF THE PREFERRED EMBODIMENT

The present invention pertains to a method and apparatus for generating an output digital signal that approximates the value of a predetermined mathematical function lying in the X-Y plane at a point defined by an input digital signal. While a variety of digital signals may be available now or in the future, the well known binary signals will be utilized to explain the operation of the present invention for simplicity and ease of understanding. Further, it should be understood that any of a great variety of predetermined mathematical functions might be approximated as will be immediately apparent to anyone skilled in the art, but the function 1/X is used herein as an aid in explaining the invention and because the function 1/X is relatively difficult to obtain and is extremely useful in a variety of operations. Further, while the mathematical function is described, throughout the specification and claims, as lying in the X-Y plane, it will be understood by those skilled in the art that this is simply a mathematical term utilized to more clearly describe and illustrate the function and its operation and this term should not be construed to limit the invention in any way.

Referring specifically to FIG. 1, a graphic representation of the mathematical function 1/X is illustrated lying in the X-Y plane. It is of course understood that the function is the reciprocal of X so that if the Y axis value of any point on the curve of the function defined by a specific X is multiplied by a predetermined number, the predetermined number is in essence divided by the specific X. For any digital system in which the function illustrated in FIG. 1 is being utilized there is a minimum and maximum bound on the values of X which are represented in FIG. 1 as $X_{min}$ and $X_{max}$, respectively. To approximate the function illustrated in FIG. 1, the portion of the curve between $X_{min}$ and $X_{max}$ is divided into N sections with the number N depending upon the equipment being utilized and the accuracy required in the approximations.

As a typical example, if 16 bit binary words are being used to define the various points on the X axis (with the 2 most significant digits indicating the polarity and always being a 01 for this example) $X_{min}$ might typically be 16384, which is represented by all 14 of the remaining digits being 0, and $X_{max}$ might typically be 32,767, with all 14 of the remaining digits being 1's. Thus, the portion of the function lying between $X_{min}$ and $X_{max}$ is represented by the 16,384 numbers lying therebetween.

If that portion of the function is divided into 256 sections, each section will be represented by 64 different numbers or binary words. For reasons which will become apparent presently, in this particular embodiment the 64 different words defining 64 different points on a particular section are completely defined by the 8 least significant bits in the 16 bit binary word representing X. Further, the particular section is described by the next 6 bits of the binary word. Thus, by drawing the subdivision lines at the natural binary number crossover points any desired point can be addressed directly from the input 16 bit word.

Once the function is divided into N sections, a straight line approximation is developed for each section. It will of course be understood that any continuous curve can be approximated by a series of short line segments and, as the number of total segments over the curve increases, the segmented approximation approaches the desired function in the limit. Referring specifically to FIG. 2, the ith section of FIG. 1 is enlarged and the ith straight line segment approximating the ith section of the function is illustrated.

Since each segment is linear, each can be defined by a slope ($S_i$) and y-intercept ($Y_i$), where the ith subscript defines the ith segment on the curve. The equation that defines the ith linear segment of the reciprocal approximation may be written as $$a/X \simeq Y_i + S_i X \tag{2}$$

The ith set of constants of $Y_i$ an $S_i$ is selected with respect to magnitude of X. If the y-axis is moved for each segment to correspond to a point $X_{0i}$, the midpoint of each segment, its equation becomes $$1/X \simeq R_i + S_i(X - X_{0i}) = R_i + S_i \Delta X \tag{3}$$

where $$R_i = Y_i + S_i X_{0i} \tag{4}$$

and $\Delta X = (X - X_{0i})$. If the entire range of the function is broken into n segments, there exists n different equations which, when considered together, completely define the reciprocal function. Each equation is made unique from the others by the values stored for the constants $R_i$ and $S_i$. The equations of the n segments may be written as $$1/X_1 \simeq R_1 + S_1 \Delta X \tag{5}$$
$$1/X_2 \simeq R_2 + S_2 \Delta X$$
$$\cdot$$
$$\cdot$$
$$1/X_i \simeq R_i + S_i \Delta X$$
$$\cdot$$
$$\cdot$$
$$1/X_n \simeq R_n + S_n \Delta X$$

The values of the constants $R_i$ and $S_i$ are calculated for each segment to ensure the best linear approximation of the segmented reciprocal curve by using the following least-mean-squares line fitting equations.

$$\overline{X} = \frac{X_1 + X_2 + \ldots + X_n}{n} \tag{6}$$

$$\overline{Y} = \frac{Y_1 + Y_2 + \ldots + Y_n}{n} \tag{7}$$

$$M = \frac{(X_1 Y_1 + X_2 Y_2 + \ldots + X_n Y_n) - n\overline{X} \cdot \overline{Y}}{(X_1^2 + X_2^2 + \ldots + X_n^2) - n\overline{X}^2} \tag{8}$$

where n is the number of discrete points on the curve. The equation of the best line is then given by $$Y = \overline{Y} + M(X - \overline{X}) = (\overline{Y} - M\overline{X}) + MX \tag{9}$$

Translating the axis to $X_o$, a point near the center of a segment, gives $$Y = (\overline{Y} - M\overline{X}) + M(X - X_0) + MX_0$$
$$= (\overline{Y} - M\overline{X} + MX_0) + M(X - X_0) \tag{10}$$
$$= R_i + S_i \Delta X \tag{11}$$

where, $$S_i = M$$

$$R_i = \overline{Y} - M\overline{X} + MX_0 = \overline{Y} - M(\overline{X} - X_0) \tag{12}$$

$$\Delta X = X - X_0$$

Equation (9) is the familiar slope-intercept form for the equation of a line and is analogous to equation (2). Equations (11) and (12) are similar to equations (3) and (4), respectively, and define the best linear fit of the reciprocal curve over a specified segment. FIG. 2 shows one segment with endpoints $X_1$ and $X_2$ with a superimposed plot of the scaled reciprocal curve, $K/X$.

Equations (6), (7), and (8) are used to linearize a discrete set of points. The reciprocal curve $K/X$ is defined for an infinite number of points between $X_1$ and $X_2$. As such, it is advantageous to develop the least-mean-squares linear fit based on the continuous curve rather than on a finite set of points.

Equations corresponding to the discrete relations (6), 7), and (8) are developed here for the continuous case, by taking n to the limit in each case.

From equation (6), and using the identity $n\Delta X = X_2 - X_1$ $$\overline{X} = \lim_{n \to \infty} \frac{X_1 + X_2 + \ldots + X_n}{n} \tag{13}$$

$$= \lim_{\substack{n \to \infty \\ \Delta X \to 0}} \frac{1}{n\Delta X} \sum_{X_1}^{X_2} X_i \Delta X$$

$$= \frac{1}{X_2 - X_1} \int_{X_1}^{X_2} X dX$$

$$= \frac{X_2^2 - X_1^2}{2(X_2 - X_1)}$$

$$= (X_2 + X_1)/2$$

Likewise, from equation (7)

$$\overline{Y} = \lim_{n \to \infty} \frac{Y_1 + Y_2 + \ldots + Y_n}{n} \tag{14}$$

$$= \lim_{\substack{n \to \infty \\ \Delta X \to 0}} \frac{1}{n\Delta X} \sum_{X_1}^{X_2} \left(\frac{K}{X_i}\right) \Delta X$$

$$= \frac{K}{X_2 - X_1} \int_{X_1}^{X_2} \left(\frac{1}{X}\right) dX$$

$$= \frac{K}{X_2 - X_1} [\ln(X_2) - \ln(X_1)]$$

$$= \frac{K}{X_2 + X_1} \ln\left[\frac{X_2}{X_1}\right]$$

Rewriting equation (8), $$M = \frac{(X_1Y_1 + X_2Y_2 + \ldots + X_nY_n) - n\overline{X}\,\overline{Y}}{(X_1^2 + X_2^2 + \ldots + X_n^2) - n\overline{X}^2} \quad (15)$$

$$= \frac{(X_1Y_1 + X_2Y_2 + \ldots + X_nY_n)/n - \overline{X}\,\overline{Y}}{(X_1^2 + X_2^2 + \ldots + X_n^2)/n - \overline{X}^2}$$

In the limit, the first term of the numerator becomes (16)

$$\lim_{n \to \infty} (X_1Y_1 + X_2Y_2 + \ldots X_nY_n)/n = \lim_{\substack{n \to \infty \\ \Delta X \to 0}} \frac{1}{n\Delta X} \sum_{X_1}^{X_2} X_i \cdot \left(\frac{K}{X_i}\right) \Delta X$$

$$= \frac{K}{X_2 - X_1} \int_{X_1}^{X_2} dX$$

$$= K$$

Similarly, the first term in the denominator becomes (17)

$$\lim_{n \to \infty} (X_1^2 + X_2^2 + \ldots + X_n^2)/n = \lim_{\substack{n \to \infty \\ \Delta X \to 0}} \frac{1}{n\Delta X} \sum_{X_1}^{X_2} X_i^2 \Delta X$$

$$= \frac{1}{X_2 - X_1} \int_{X_1}^{X_2} X^2 dX$$

$$= \frac{X_2^3 - X_1^3}{3(X_2 - X_1)}$$

Substituting (13), (14), (16), and (17) into (15) gives (18)

$$M = \frac{K - \frac{1}{2}(X_2 + X_1)\left(\frac{K}{X_2 - X_1}\right)\ln\left(\frac{X_2}{X_1}\right)}{\frac{X_2^3 - X_1^3}{3(X_2 - X_1)} - \frac{(X_2 + X_1)^2}{4}}$$

$$= \frac{K\left[1 - \frac{1}{2}\left(\frac{X_2 + X_1}{X_2 - X_1}\right)\ln\left(\frac{X_2}{X_1}\right)\right]}{\frac{(X_2 - X_1)(X_2^2 + X_1X_2 + X_1^2)}{3(X_2 - X_1)} - \frac{X_2^2 + 2X_1X_2 + X_1^2}{4}}$$

$$= \frac{K\left[1 - \frac{1}{2}\left(\frac{X_2 + X_1}{X_2 - X_1}\right)\ln\left(\frac{X_2}{X_1}\right)\right]}{\frac{4X_2^2 + 4X_1X_2 + 4X_1^2 - 3X_2^2 - 6X_1X_2 - 3X_1^2}{12}}$$

$$= \frac{12 K\left[1 - \frac{1}{2}\left(\frac{X_2 + X_1}{X_2 - X_1}\right)\ln\left(\frac{X_2}{X_1}\right)\right]}{(X_2 - X_1)^2}$$

$$= \frac{12(K - \overline{X}\,\overline{Y})}{(X_2 - X_1)^2}$$

Gathering all equations together for clarity and convenience gives the least-mean-squares line segment constants in terms of the segment endpoints $X_1$ and $X_2$.

$$Y = R_i + S_i\Delta X \quad (19)$$

$$R_i = \overline{Y} - M(\overline{X} - X_0) \quad (20)$$

$$S_i = M \quad (21)$$

$$\overline{X} = (X_1 + X_2)/2 \quad (22)$$

$$\overline{Y} = \left(\frac{K}{X_2 - X_1}\right)\ln\left(\frac{X_2}{X_1}\right) \quad (23)$$

$$M = \frac{12(K - \overline{X}\,\overline{Y})}{(X_2 - X_1)^2} \quad (24)$$

Referring specifically to FIG. 3, a block diagram of the hardware that will achieve the n segment approximation is illustrated. The hardware includes 2 low density PROM lookup tables 10 and 11 for storage of the segmentation constants $R_i$ and $S_i$, respectively. The address inputs for each of the PROMs 10 and 11 are connected to an input terminal 15 adapted to have the 16 bit input word representative of X supplied thereto. The 2 most significant bits of the 16 bit word provide an indication of the polarity. The next six most significant bits of the input word X are used to address the initial position ($R_i$) PROM lookup table 10 as well as the slope ($S_i$) PROM lookup table 11. The 8 least significant bits of X are used to generate the offset $\Delta X$. In this embodiment the various possible values for $\Delta X$ are stored in a PROM lookup table 17 and the 8 least significant bits are applied to the address input from the input terminal 15. It will of course be apparent that the $\Delta X$'s for each of the N line segments are the same and, therefore, only 64 8 bit words need be stored in the table 17. In the present embodiment the point $R_i$ is located at approximately the center of the ith line segment to reduce the errors between the actual function and the approximation. However, if the point $R_i$ were located at the end, $X_i$, of the line segment the 8 least significant bits of the input X would be $\Delta X$ and no further apparatus would be required. In this situation the input termainl 15 would be connected directly to a first input of a multiplier 20 instead of being connected through the PROM lookup table 17 as in the present embodiment. Various forms of dedicated logic might also be utilized to convert the 8 least significant bits of the input X to the $\Delta X$ value.

In addition to the output from the lookup table 17 being connected to a first input of the multiplier 20, the output from the lookup table 11 is connected to a second input so that the two are multiplied together to provide an output, $S_i\Delta X$. This output from the multiplier 20 is supplied to a first input of a summing circuit 25, a second input of which is connected to the output of the lookup table 10. Thus, the output of the summing circuit 25 is equal to $R_i+S_i\Delta X$. This value will be recognized as the Y value of the ith line segment at the point defined by the input X. The multiply and add functions are achieved by using high speed multiplier and adder integrated circuits which are commercially available.

Using the above described equations, the end values for $R_i$ and $S_i$ are precalculated and stored in the lookup tables 10 and 11. Also, if a lookup table is used for the value $\Delta X$ these values are determined and stored in the lookup table 17. It should be noted that the lookup table used to store the 16,384 16 bit words in the prior art required a storage capacity of 262,144 bits. Whereas in the present embodiment the words defining the initial position, $R_i$, are 20 bit words and the words defining the slope, $S_i$, are 12 bit words. Thus, since the function is divided into 256 sections and each section requires a slope and an initial position, 32 bits are required for each section or a total of 8192 bits storage is required. Thus, the amount of storage and apparatus required in the present device are greatly reduced over the prior art apparatus. Further, because the least-mean-squares line segments are utilized to approximate each section of the predetermined mathematical function, the errors in the system are greatly reduced. For example, in the system as described, i.e., using 16 bits words to describe X and dividing the function into 256 sections, the answer is better than plus or minus a bit error.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Apparatus for generating an output digital signal that approximates the value of a predetermined mathematical function lying in the X-Y plane at a point defined by an input digital signal comprising:
   position storage means having stored therein a plurality of precalculated points, $R_i$, each lying on a different linear least-means-squares line segment approximating a different section of the mathematical function, said position stroage means having an input connected to receive at least a portion of the input digital signal, and an output, for providing an output signal at the output thereof representative of an appropriate one of the stored precalculated points in response to the input of at least the portion of the input digital signal;
   slope storage means having stored therein the plurality of precalculated slopes, $S_i$, each defining the slope of a different one of the line segments, said slope storage means having an input connected to receive at least a portion of the input digital signal, and an output, for providing an output signal at the output thereof representative of an appropriate one of the stored slopes in response to the input of at least the portion of the input digital signal;
   means having an input connected to receive at least a portion of the input digital signal and an output, for determining the distance, $\Delta X$, along the X axis, from the point $R_i$ to the point defined by the input digital signal and providing at the output thereof an output signal representative of $\Delta X$;
   multiplication means connected to the outputs of said slope storage means and said distance determining mean for providing on an output thereof an output signal which is the product, $S_i\Delta X$, of the applied output signals, and
   summing means connected to the outputs of said position storage means and said multiplication means for providing on an output thereof an output signal which is the sum, $R_i+S_i\Delta X$, of the output signal applied thereto and which is an approximation of the value of the mathematical function at the point defined by the input digital signal.

2. Apparatus as claimed in claim 1 wherein the position storage means and the slope storage means include lookup table PROM's.

3. Apparatus as claimed in claim 1 wherein the distance determining means includes a lookup table PROM.

4. Apparatus as claimed in claim 1 wherein the predetermined mathematical function is 1/X and the output digital signal is a reciprocal of the input digital signal.

5. Apparatus as claimed in claim 1 wherein the precalculated points, $R_i$, are each approximately centrally located on the associated line segment.

6. Apparatus as claimed in claim 1 wherein the predetermined mathematical function is 1/X, the input digital signal includes at least a fourteen bit binary word having minimum and maximum boundaries of 16384 and 32767, respectively, with the mathematical function, between the boundaries, being approximated by 256 line segments, the position of the point defined by the input digital signal along any specific line segment being defined by the eight least significant bits of the input word and the six most significant bits defining the specific line segment.

* * * * *